(12) United States Patent
Verlaan et al.

(10) Patent No.: US 10,461,950 B2
(45) Date of Patent: Oct. 29, 2019

(54) PREVENTING TRANSMISSION OF DUPLICATE NOTIFICATIONS TO MULTIPLE APPLICATIONS ON A CLIENT DEVICE

(71) Applicant: MICROSOFT TECHNOLOGY LICENSING, LLC, Redmond, WA (US)

(72) Inventors: Adri Stephane Verlaan, Seattle, WA (US); Carl Frederick Hirschman, Seattle, WA (US); Hang Vi Quan, Redmond, WA (US); Hansel Ivan Gene Ip, Seattle, WA (US); Orkhan Muradov, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 65 days.

(21) Appl. No.: 15/901,795

(22) Filed: Feb. 21, 2018

(65) Prior Publication Data
US 2019/0260601 A1 Aug. 22, 2019

(51) Int. Cl.
*G06F 15/16* (2006.01)
*H04L 12/18* (2006.01)
*H04L 29/06* (2006.01)

(52) U.S. Cl.
CPC ...... *H04L 12/1895* (2013.01); *H04L 65/4015* (2013.01)

(58) Field of Classification Search
CPC ................. H04L 12/1895; H04L 65/4015
(Continued)

(56) References Cited

U.S. PATENT DOCUMENTS 9,871,905 B1 * 1/2018 Habiger ............ H04M 1/72525
9,906,645 B2 * 2/2018 Mathur ............. H04M 3/42221
(Continued)

OTHER PUBLICATIONS

"Create notification Sends notifications to your users", Retrieved from: <<https://web.archive.org/web/20170413095908/https://documentation.onesignal.com/reference>>, Apr. 13, 2017, 74 Pages.
(Continued)

*Primary Examiner* — Melvin H Pollack
(74) *Attorney, Agent, or Firm* — Newport IP, LLC; Mike R. Cicero

(57) ABSTRACT

A system prevents user-activity events from triggering transmission of duplicative notifications to multiple applications. The system may receive subscriptions for notifications from multiple applications installed on a single client device. Trigger criteria for the applications' subscriptions overlap such that a "single" user-activity event may satisfy trigger criteria for multiple subscriptions. The system receives event data that indicates when a user-activity event has satisfied trigger criteria for the multiple subscriptions associated with the client device. Rather than indiscriminately transmitting duplicative notifications, the system selects individual "satisfied" subscriptions to fulfill. Thus, when subscriptions are satisfied for multiple different applications on a single client device, the system may deploy a subscription prioritization engine to select a single one of the multiple different applications to transmit a notification to. Stated alternatively, for individual user-activity events, the subscription prioritization engine determines a subset of "satisfied" subscriptions to fulfill and to refrain from fulfilling.

20 Claims, 6 Drawing Sheets

(58) Field of Classification Search
USPC .......................................................... 709/204
See application file for complete search history.

(56) References Cited

U.S. PATENT DOCUMENTS

| | | | | |
|---|---|---|---|---|
| 10,009,391 | B1* | 6/2018 | Smith | G06F 16/972 |
| 10,097,973 | B2* | 10/2018 | Gross | H04W 4/025 |
| 10,133,812 | B2* | 11/2018 | Lee | G06F 16/9535 |
| 10,185,496 | B2* | 1/2019 | Sazawa | G06F 3/06 |
| 10,216,549 | B2* | 2/2019 | Bott | G06F 9/541 |
| 2013/0144974 | A1 | 6/2013 | Haakenson et al. | |
| 2016/0029402 | A1* | 1/2016 | Backholm | H04W 76/10 370/329 |
| 2017/0099592 | A1* | 4/2017 | Loeb | H04L 67/303 |
| 2018/0032997 | A1* | 2/2018 | Gordon | G06Q 20/3224 |
| 2018/0349485 | A1* | 12/2018 | Carlisle | G06Q 50/01 |
| 2019/0122266 | A1* | 4/2019 | Ramer | G06Q 30/0247 |

OTHER PUBLICATIONS

"Dedupe notifications between native app and web page", Retrieved from: <<https://bugs.chromium.org/p/chromium/issues/detail?id=402223>>, Aug. 9, 2014, 4 Pages.

"How to uniquely identify a device even the app deleted and reinstalled in iOS?", https://web.archive.org/web/20160723145326/https:/stackoverflow.com/questions/32775871/how-to-uniquely-identify-a-device-even-the-app-deleted-and-reinstalled-in-ios>>, Jul. 23, 2016, 2 Pages.

"UDID and other device identifiers for iOS", Retrieved from: <<https://support.urbanairship.com/hc/en-us/articles/213492363-UDID-and-other-device-identifiers-for-iOS>>, Jan. 24, 2018, 2 Pages.

"Uniquely identify an iOS device", Retrieved from: <<https://web.archive.org/web/20170725235910/https:/forums.developer.apple.com/thread/70991>>, Jul. 25, 2017, 5 Pages.

Dobrev, Anton, "Same device can be registered multiple times (iOS)", Retrieved from: <<https://www.telerik.com/forums/same-device-can-be-registered-multiple-times-(ios)>>, Sep. 5, 2014, 6 Pages.

Ranjan, Rajeev, "Configure & Send Push Notification on iOS Device", Retrieved from: <<http://blogs.shephertz.com/2017/06/15/configure-send-push-notification-on-ios-device/>>, Jun. 15, 2017, 7 Pages.

Saxena, Ankit, "Progressive web vs. native apps: who will own the mobile experience?", Retrieved from: <<https://yourstory.com/2017/03/progressive-web-vs-native-apps-will-mobile-experience/>>, Mar. 2, 2017, 8 Pages.

Tennant, Simon, "Duplicate pushes received for a single device #17", Retrieved from: <<https://github.com/buddycloud/buddycloud-pusher/issues/17>>, Feb. 11, 2015, 4 Pages.

* cited by examiner

Exemplary Subscription Data
300

| Device | Subscription ID | Handle 108 | Application ID 110 | Device ID 112 | Trigger Criteria 114 |
|---|---|---|---|---|---|
| Client Device #1 124(1) | Subscr_1 106(1) | Handle 108(1)(1) | File Hosting Program | IMEI = 123 | Notify File Hosting Program When: *Event Type = Share or Edit or View* AND *File Type = Any* |
| | Subscr_2 106(2) | Handle 108(2)(1) | Word Processor | IMEI = 123 | Notify Word Processor When: *Event Type = Share or Edit* AND *File Type = ".doc" OR ".docx" OR ".docm"* |
| | Subscr_3 106(3) | Handle 108(3)(1) | Presentation Program | Hostname = DESKTOP_1 | Notify Presentation Program When: *Event Type = Share or Edit* AND *File Type = ".ppt"* |
| Client Device #2 124(2) | Subscr_4 106(4) | Handle 108(1)(2) | File Hosting Program | IMEI = 456 | Notify File Hosting Program When: *Event Type = Share* AND *File Type = Any* |
| | Subscr_5 106(5) | Handle 108(4)(2) | Application 126(4) | IMEI = 456 | Notify Application 128(4) When: *Event Type = Initial View* AND *File Status = Shared by Me* |
| ... | | | | | |
| Client Device # N 124(N) | Subscr_N 106(N) | Handle 108(N)(N) | Application 126(N) | IMEI = 789 | Notify Application 128(N) When: *Event Type = Share or Edit* |

FIGURE 3

PREVENTING TRANSMISSION OF DUPLICATE NOTIFICATIONS TO MULTIPLE APPLICATIONS ON A CLIENT DEVICE

BACKGROUND

Some content sharing platforms are designed to generate notifications in response to various types of user-activity events occurring with respect to shared data files. For example, it is often desirable to notify a particular user when another user initially shares a data file with that particular user. It may also be desirable to notify that particular user whenever the data file is subsequently viewed and/or edited by other users. In some cases, a specific type of data file that is shared between users may be compatible with multiple different software applications that are installed on a particular client device. Thus, when a user-activity event occurs with respect to a data file of this specific type, a user that is notified of the user-activity event may be able to deploy multiple applications to access (e.g., view, edit, etc.) content of the data file.

Under a variety of circumstances, a single user-activity event may trigger notifications to be transmitted through multiple different notification channels to a single client device. For example, different applications that are installed on the same client device may each have notification settings that request a notification in response to the same single user-activity event. Unfortunately, receiving notifications that are duplicative in the sense that they inform a user at a single client device of the same event may lead to user dissatisfaction. Additionally, transmitting duplicative notifications responsive to a single user-activity event consumes an unnecessarily large amount of computing resources. Specifically, because each notification consumes a certain amount of network bandwidth, network bandwidth consumption is incrementally increased each time a duplicative notification is transmitted to a single client device.

It is with respect to these and other considerations that the disclosure made herein is presented.

SUMMARY

Technologies described herein enable a system to prevent user-activity events from triggering transmission of duplicative notifications to multiple applications that are installed on a client device. Generally described, embodiments described herein enable a system to obtain multiple subscriptions that correspond to multiple applications on a client device. Individual subscriptions may each correspond to an individual application and may each include trigger criteria that defines user activity for triggering transmission of a notification to the individual application. The system may then receive event data indicating that a user-activity event has satisfied trigger criteria for subscriptions of more than one application on the client device. For example, suppose that a word processor and a file hosting program are installed on the client device. Further suppose that the word processor has subscribed for notifications when predefined user activities are performed with respect to shared ".DOCX" data files and that the file hosting program has subscribed for notifications when the predefined activities are performed with respect to shared data files of any type. In this example, when event data indicates that the predefined user activities have been performed with respect to a ".DOCX" data file, trigger criteria for both the word processor's subscription and the file hosting program's subscription will be satisfied. Rather than transmitting duplicative notifications of the predefined user activities to both the word processor and the file hosting program, however, the system may transmit a single notification to whichever one of these applications has a higher priority for being used to notify a user of the client device. For example, the word processor may be more suitable than the file hosting program for accessing and/or modifying content of the ".DOCX" file and may, therefore, be selected over the file hosting program for transmission of a notification.

Implementations of the techniques described herein reduce network traffic that results from subscriptions for "push" notifications with overlapping trigger criteria being set up by multiple applications on a single client device. For example, rather than indiscriminately transmitting duplicative notifications to multiple applications on a client device whenever a user-activity event satisfies trigger criteria for multiple subscriptions associated with the client device, according to the techniques described herein, a system may examine characteristics of the user-activity event to select a particular one of the multiple applications to transmit a notification to. Then, the system may fulfill a subscription for the particular application that is selected while refraining from fulfilling other subscription(s) for other one(s) of the multiple applications for which trigger criteria were satisfied—but which were not selected to receive a notification. Since each notification that is transmitted to the client device consumes an amount of network bandwidth, utilization of the disclosed techniques prevent transmission of a duplicative notification to the "single" client device and reduce network traffic for each instance of utilization.

In an exemplary implementation, a subscription manager obtains subscription data that defines subscriptions for multiple applications that are installed on a client device. The subscription data may be received via multiple subscription application programming interface (API) calls that are transmitted by individual ones of the multiple applications. Individual subscription API calls may include trigger criteria for triggering generation and transmission of a notification to a corresponding application. Individual subscription API calls may also include a handle for addressing the notification to the corresponding application. For example, a file hosting program that is installed on a client device may send a subscription API call to the subscription manager to set up a subscription for receiving "push" notifications at the client device when predefined user-activities are performed with respect to a content sharing platform.

Since individual applications may each set up corresponding subscriptions that independently define trigger criteria, under various circumstances a single user-activity event may satisfy trigger criteria for multiple subscriptions that correspond to different applications that are installed on the client device. In order to determine how to prioritize which one(s) of these different applications should have its subscription fulfilled (and which should not), the subscription manager may examine application priority data that indicates predefined criteria to prioritize notifying a user of the user-activity event through a particular application on the client device over notifying the user of the user-activity event through one or more other applications on the client device. For example, the application priority data may indicate predefined user-activity event characteristics for prioritizing a word processor over other application(s) for transmission of a notification.

In some implementations, the predefined user-activity event characteristics may define a specific type of user activity (e.g., sharing a data file, viewing a data file, editing a data file, adding a comment to a data file, etc.) that results in the particular application being prioritized to receive a notification over other applications on the client device. For example, if a user-activity event is characterized as a first user adding a comment to a data file that is shared with a second user, a word processor that is capable of rendering the comment may be prioritized for transmitting a notification of the added comment over other applications that are incapable of rendering the comment. In some implementations, the predefined user-activity event characteristics may define a specific type of data file (e.g., a ".DOCX" type data file, a ".PPT" type data file, etc.) that results in the particular application being prioritized to transmit a notification. For example, if a user-activity event is characterized as a first user sharing with a second user a type of data file that is typically opened by the second user with a word processor, this word processor may be prioritized for transmitting a notification over another application that the second user rarely/never uses to open this type of data file.

After subscriptions have been set for multiple applications that are installed on the client device, the subscription manager may receive event data indicating characteristics of a user-activity event that satisfy trigger criteria for multiple ones of the subscriptions. Stated alternatively, the characteristics of the user-activity event may satisfy both first trigger criteria for triggering a notification to a first application on the client device as well as second trigger criteria for triggering a notification to a second application on the client device. Under these circumstances, rather than indiscriminately transmitting duplicative notifications (e.g., multiple notifications that are designed to describe to and/or notify a user of the same user-activity event) to both the first application and the second application, the subscription manager may utilize the application priority data to determine which one of the first application and the second application has priority for receiving a notification of the user-activity event. In some instances, this priority may be static such that a particular application takes priority over another application regardless of characteristics of the user-activity event. In some instances, this priority may be dynamically determined for each individual user-activity event based on characteristics of the user-activity event. Then, the subscription manager may fulfill the subscription for the higher priority application and also refrain from fulfilling the subscription for the other application.

As a specific but non-limiting example, suppose that the application priority data defines characteristics for prioritizing the word processor over all other applications on the client device because a specific feature of the word processor is that it can be used to add to a data file comments that are viewable only through a word processor. Further suppose that the file hosting program is capable of rendering text of the data file at the client device, but not the comments that are added through the specific feature of the word processor. It can be appreciated that under these specific circumstances it may be more appropriate to address (e.g., point to using a Uniform Resource Identifier) a notification of comments being added to the data file to the word processor, as opposed to the file hosting program which cannot render the comments. This is because only the word processor can immediately render the comments to fully inform a person of the details of the user-activity event (e.g., what the added comments say). Under this specific example, the subscription manager may analyze the event data to determine that the user-activity event corresponds to a user adding a comment to a shared data file. Based on this determination, the subscription manager may reference the application priority data to determine that the word processor is prioritized over all other applications for receiving notifications of comments being added via the specific feature of the word processor.

Then, the subscription manager may ultimately fulfill the subscription for the word processor by generating a notification of the user-activity event and transmitting the generated notification to the word processor. Even if other applications on the client device have set up subscriptions for which the user-activity event satisfied trigger criteria, the subscription manager may refrain from fulfilling subscriptions for these other applications to prevent transmission of a duplicative notification(s) to the client device. Thus, in this example, not only has the experience been improved for a user of the client device (e.g., receiving duplicative notifications is considered irritating by many people), network traffic has been reduced since only a single notification is sent to the client device rather than multiple duplicative notifications being sent to the word processor as well as to the other applications for which the trigger criteria were satisfied.

It should be appreciated that any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or concepts such as, for example, individual trigger criteria and/or individual notifications and/or individual subscriptions may be distinguished by numerical designations without such designations corresponding to the claims or even other paragraphs of the Summary and/or Detailed Description. For example, any designation of "first trigger criteria" and "second trigger criteria" within a paragraph of this disclosure is used solely to distinguish two different instances of trigger criteria within that specific paragraph—not any other paragraph and particularly not the claims.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with another number included within a parenthetical to refer to each individual item. Generic references to the items may use the specific reference number without the sequence of letters.

FIG. 3 illustrates exemplary subscription data for use by the subscription manager to prevent a user-activity event from triggering transmission of duplicative notifications to individual client devices.

DETAILED DESCRIPTION

Figure 1:
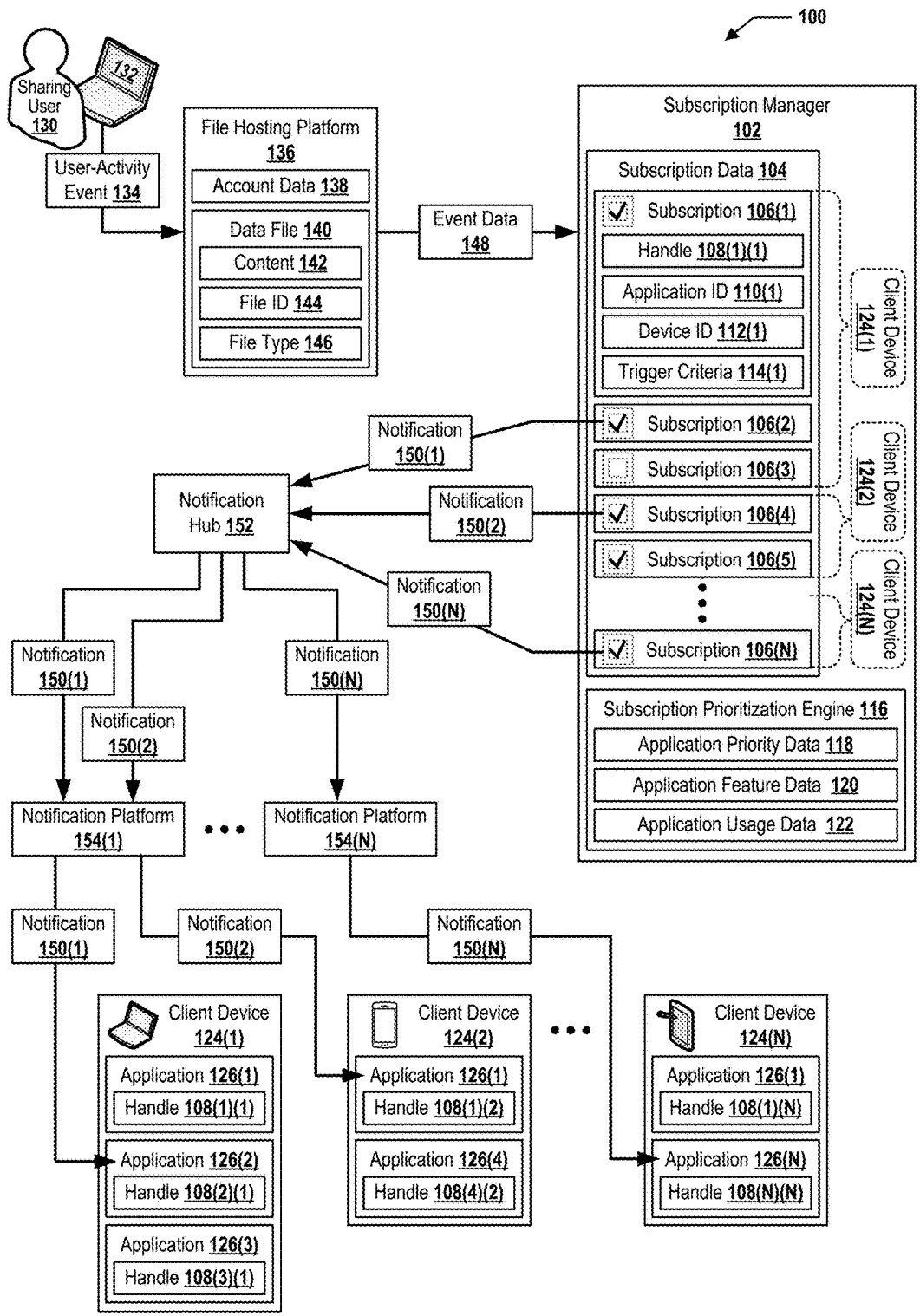
FIG. 1 illustrates an exemplary system for deploying a subscription manager to prevent a user-activity event from triggering transmission of duplicative notifications to more than one application on one or more client devices.

The following Detailed Description describes technologies for preventing user-activity events from triggering transmission of duplicative notifications to multiple applications that are installed on a client device. Generally described, embodiments disclosed herein enable a system to receive subscriptions for notifications from multiple different applications that are installed on a single client device. Individual subscriptions may include trigger criteria for triggering transmission of notifications to inform users of user activity events having predetermined characteristics to a corresponding application. Trigger criteria for the different applications' subscriptions may at least partially overlap such that a single user-activity event may satisfy trigger criteria for multiple subscriptions. The system receives event data that indicates when a user-activity event has satisfied trigger criteria for the multiple subscriptions associated with the client device. Rather than indiscriminately transmitting duplicative notifications of the user-activity event to whichever applications correspond to these multiple "satisfied" subscriptions, the techniques described herein enable the system to determine which individual one(s) of these "satisfied" subscriptions to fulfill. For example, when subscriptions are satisfied for multiple different applications that are installed on a single client device, embodiments of the system disclosed herein may deploy a subscription prioritization engine to select a single one of the multiple different applications to transmit a notification to. Stated alternatively, the subscription prioritization engine determines a subset of the "satisfied" subscriptions to fulfill (e.g., by transmitting a notification to a corresponding application) and also which "satisfied" subscriptions to refrain from fulfilling (e.g., by not sending any notification to a corresponding application).

Accordingly, it can be appreciated that the techniques described herein improve computing efficiencies for at least the reason that duplicative notifications may be prevented when different applications on a single client device independently generate "push notification" subscriptions with overlapping trigger criteria. For example, each individual communication (such as the notifications described herein) that is transmitted to a client device inherently results in some amount of network traffic. Therefore, each duplicative notification that is prevented by implementing the disclosed techniques results in a reduction in network traffic and bandwidth usage. As another example, each notification that is received by a client device causes some amount of processing cycles to be performed by the client device. For example, the client device may be forced to decrypt the notification, to cause a display-screen to render the notification, to receive a user input to view and/or dismiss the notification, etc. Therefore, each duplicative notification that is prevented from being transmitted to a particular client device also decreases the computational strain on the processing unit(s) (e.g., a central processing unit (CPU) and/or graphical processing unit (GPU)) of that particular client device.

Turning now to FIG. 1, illustrated is an exemplary system 100 for preventing a user-activity event 134 from triggering transmission of duplicative notifications to more than one application 126 on one or more client devices 124. As illustrated, a subscription manager 102 may include subscription data 104 that defines subscriptions 106 for multiple different applications 126 that are installed across multiple client devices 124. Individual subscriptions 106 may correspond to an individual instance of an application 126 that is installed on a particular client device 124. For example, a first subscription 106(1) may correspond to an individual instance of a first application 126(1) that is installed on a first client device 124(1) such that fulfillment of the first subscription 106(1) includes transmitting a notification of a "triggering" user-activity event 134 to the individual instance of the first application 106(1) that is installed on the first client device 124(1).

In some implementations, the subscriptions 106 are grouped according to individual ones of the client devices 124. For example, as illustrated, the subscription data 104 includes a first subscription grouping that corresponds to the first client device 124(1), a second subscription grouping that corresponds to a second client device 124(2), and so on (each grouping is outlined with a dashed bracket and labeled according to client device). The first subscription grouping includes a first subscription 106(1) for an instance of the first application 126(1) that is installed on the first client device 124(1), a second subscription 106(2) for an instance of a second application 126(2) that is installed on the first client device 124(1), and a third subscription 106(3) for an instance of a third application 126(3) that is installed on the first client device 124(1). The second subscription grouping includes a fourth subscription 106(4) for an instance of the first application 126(1) that is installed on the second client device 124(2) and a fifth subscription 106(5) for an instance of a fourth application 126(4) that is installed on the second client device 124(2).

Individual subscriptions 106 may include a handle 108 that is usable to address communications such as, for example, "push" notifications to a specific instance of an application 126 that is installed on a particular client device 124. As illustrated, the handle 108(1)(1) is shown as corresponding to the first subscription 106(1) and is usable to address (e.g., route) communications to the instance of the first application 126(1) that is installed on the first client device 124(1). For notation purposes, individual handles 108 are labeled herein with a first parenthetical that includes an integer indicating which application 126 the individual handle 108 is associated with and a second parenthetical that includes an integer indicating which client device 124 the individual handle 108 is associated with. Thus, the handle 108(1)(1) may be stored in association with the first subscription 106(1) to enable the subscription manager 102 to address communications to the instance of the first application 126(1) that is installed on the first client device 124(1), whereas the handle 108(1)(2) may be stored in association with the fourth subscription 106(4) to enable the subscription manager 102 to address communications to the instance of the first application 126(1) that is installed on the second client device 124(2).

Individual subscriptions 106 may include an application identifier (ID) 110 that uniquely identifies individual ones of the applications 126. For example, the first application ID 110(1) that is shown as being stored in association with the first subscription 106(1) may be a unique identifier that specifically corresponds to the first application 126(1). In this way, the subscription manager 102 may examine the application ID 110 for any particular subscription 106 to determine which application 126 the particular subscription 106 corresponds to. Since the subscription manager 102 is enabled to determine which applications 126 multiple "satisfied" subscriptions correspond to, in various implementations, the subscription manager 102 may select for fulfillment whichever "satisfied" subscription corresponds to an application that is determined to have the highest priority for use in notifying a person of the user-activity event 134.

For purposes of the present discussion, assume that the first application identifier 110(1) specifically identifies the first application 126(1) as a file hosting program and is stored in association with each of the first subscription 106(1) and the fourth subscription 106(4). Further assume that a second application identifier 110(2) (not shown) specifically identifies the second application 126(2) as a word processor and is stored in association with the second subscription 106(2). Exemplary file hosting programs include various client applications that are specifically configured to communicate with a file hosting platform 136 (e.g., the DROPBOX APP desktop application developed by DROPBOX, the BOX DRIVE desktop application developed by BOX, and/or the ONEDRIVE desktop client that is native to WINDOWS 10). Exemplary word processors include various desktop client applications that are specifically configured to facilitate composing, editing, reading, and/or printing word processing documents such as, for example, a ".DOCX" data file.

Individual subscriptions 106 may include a device identifier (ID) 112 that uniquely identifies individual ones of the client devices 124. For example, a first device ID 112(1) that is shown as being stored in association with the first subscription 106(1) may be a unique identifier that specifically corresponds to the first client device 124(1). In this way, the subscription manager 102 may examine the device ID 112 for any particular subscription 106 to determine which client device 124 the particular subscription 106 corresponds to. In some implementations, the device IDs 112 may include individual character strings that are uniquely assigned to individual devices (e.g., 40-character Unique Device Identifier (UDID) character strings that are assigned to APPLE devices, International Mobile Equipment Identity (IMEI) numbers, etc.). In some implementations, the device IDs 112 may include one or more individual host names (e.g., a nodename in the form of a label that is assigned to an individual client device 124 and is usable to identify the individual client device 124).

Individual subscriptions 106 may include trigger criteria 114 that defines certain user-activity for triggering notifications to a corresponding instance of an application 126. The trigger criteria 114 of any particular subscription 106 may be provided to the subscription manager 102 by individual instances of the applications 126 to inform the subscription manager 102 of what specific types of user-activity events 134 are to result in a notification 150 being transmitted to the individual instances of the applications 126.

For purposes of the present discussion, assume that the first subscription 106(1) and the fourth subscription 106(4) each define corresponding trigger criteria 114 to include a sharing user 130 performing one or more predefined user activities (e.g., viewing a file, editing a file, sharing a file, etc.) with respect to any data files that are stored on a file hosting platform 136 and that are shared with a user account that account data 138 indicates is associated with the individual client device(s) 124. Further assume that the second subscription 106(2) defines corresponding second trigger criteria 114(2) (not shown) to include the sharing user 130 performing the one or more predefined user activities (e.g., viewing a file, editing a file, sharing a file, etc.) with respect to word processing documents (e.g., as indicated by a file extension ".DOCX") that are stored on the file hosting platform 136 and that are shared with the user account that the account data 138 indicates is associated with the individual client device(s) 124.

Thus, under circumstances in which a sharing user 130 edits a word processing document (e.g., a data file with the file extension ".DOCX"), all of the first trigger criteria 114(1) corresponding to the first subscription 106(1), the fourth trigger criteria 114(4) (not shown) corresponding to the fourth subscription 106(4), and the second trigger criteria 114(2) (not shown) corresponding to the second subscription 106(2) will be simultaneously satisfied. It can be appreciated, therefore, that various instances of the trigger criteria 114 may overlap (wholly or partially) across the various instances of the applications 126 and/or across the various client devices 124. It can further be appreciated that fulfilling both the first subscription 106(1) and the second subscription 106(2) in response to the sharing user 130 editing the word processing document would result in duplicative notifications being transmitted to the first client device 124(1)—the unfortunate result being unnecessary network traffic through a notification hub 152 and/or notification platform 154.

Accordingly, the subscription manager 102 may include a subscription prioritization engine 116 for selecting one or more "satisfied" ones of the subscriptions 106 to fulfill and/or refrain from fulfilling. As used herein, the term "satisfied subscription" may refer generally to a subscription 106 having predefined trigger criteria 114 that matches characteristics of a user-activity event 134. In the illustrated example, individual ones of the subscriptions 106 that include trigger criteria 114 that is satisfied by the user-activity event 134 are labeled with a checkbox that includes a checkmark therein. In contrast, the third subscription 106(3) includes trigger criteria 114(3) (not shown) that is not satisfied by the user-activity event 134. Thus, the third subscription 106(3) is labeled with a checkbox that is unchecked (i.e., omits a checkmark) to indicate that the illustrated user-activity event 134 has not satisfied the third subscription 106(3).

In various implementations, the subscription prioritization engine 116 may determine which satisfied subscriptions to fulfill and/or refrain from fulfilling based on application priority data 118 that indicates a priority for transmitting a notification 150 of the user-activity event 134 to a particular one of the applications 126 rather than one or more other ones of the applications 126. For example, the application priority data 118 may indicate that the second application 126(2) has a higher priority for transmitting a notification 150 of the user-activity event 134 than the first application 126(1). Thus, under various circumstances in which both the first subscription 106(1) and the second subscription 106(2) have trigger criteria 114 that is satisfied by the user-activity event 134, the subscription prioritization engine 116 may select only the second subscription 106(2) for fulfillment, or vice versa.

In some implementations, the application priority data 118 may indicate an ordered ranking (e.g., specified ranks within a hierarchy) of the applications 126 for prioritizing subscription fulfilment. Thus, when subscriptions 106 for multiple applications 126 on any one client device 124 are satisfied, the subscription prioritization engine 116 may select for fulfillment whichever individual application 126 is ranked highest within the ordered ranking. As a specific but nonlimiting example, the application priority data 118 may rank the second application 126(2) over the first application 126(1) for transmitting notifications 150 to such that if a particular user-activity event 134 satisfies trigger criteria 114 for both applications 126 a single notification 150 will be sent exclusively to the second application 126(2).

In some implementations, the application priority data 118 may include one or more predefined user-activity event characteristics that are usable to determine an individual application(s) 126, from multiple applications 126 that corresponds to satisfied subscriptions, that is to be prioritized for transmitting a notification 150 of a particular user-activity event 134. For example, suppose that the application priority data 118 defines first user-activity event characteristics as sharing a word processing file to cause the subscription prioritization engine 116 to prioritize the second application 126(2) over the first application 126(1). Thus, as illustrated in FIG. 1, if the user-activity event 134 corresponds to the sharing user 130 sharing a word processing file (which would satisfy both the first and second trigger criteria), the subscription prioritization engine 116 may observe that the shared file is a word processing file and respond to this observation by fulfilling the second subscription 106(2) but not the first subscription 106(1). As used herein, the term "user-activity event characteristics" may generally refer to any discernable characteristics that are useable to characterize and/or describe a particular user-activity event. For example, a type of user activity such as sharing and/or viewing a file may be aptly described as a user-activity event characteristic. As another example, a file type (e.g., a ".DOCX") of a data file that was edited during a user-activity event may aptly be described as a user-activity event characteristic.

In various implementations, the application priority data 118 may be wholly or partially user-defined such that a user may manually define circumstances for prioritizing transmission of a notification to the second application 126(2) over the first application 126(1). For example, a user may define application priority data 118 to prioritize transmission of a notification 150 to the word processor if a comment is added to a ".DOCX" data file, but to the third application 126(3) if a ".PDF" data file is viewed or edited (e.g., the word processor might be incapable of rendering the ".PDF" data file).

In various implementations, the subscription prioritization engine 116 may determine which satisfied subscriptions to fulfill and/or refrain from fulfilling based on application feature data 120 that indicates a number(s) and/or types of features that the individual applications 126 include with respect to certain file types. For example, the subscription manager 102 may receive event data 148 that describes various characteristics of the user-activity event 134 such as a file type 146 of a data file 140 that has been edited and/or shared in the user-activity event 134. Then, based on the file type 146 of the data file 140, the subscription prioritization engine 116 may examine the application feature data 120 to determine which particular application 126, of all the applications 126 that correspond to satisfied subscriptions, has the most features that are usable in association with the data file 140.

In various implementations, the subscription prioritization engine 116 may generate at least some of the application priority data 118 based on the application feature data 120. For example, based on determining that the second application 126(2) includes more features for viewing and/or modifying content of ".DOCX" type data files, the subscription prioritization engine 116 may generate a priority rule within the application priority data 118 to prioritize fulfillment of the second subscription 106(2) over the first subscription 106(1) when the user-activity event 134 corresponds to a modification of a ".DOCX" type data file.

In various implementations, the subscription prioritization engine 116 may determine which satisfied subscriptions to fulfill and/or refrain from fulfilling based on application usage data 122 that indicates usage level(s) of the various individual applications 126. For example, under circumstances in which two different subscriptions 106 are satisfied by a particular user-activity event 134, the subscription prioritization engine 116 may examine the application usage data 122 to determine which particular application 126, of the two applications 126 that correspond to the two satisfied subscriptions, has the higher level of usage as compared to the other application.

In some implementations, the application usage data 122 may indicates usage levels of one or more applications 126 with respect to a general populace. For example, the application usage data 122 may indicate that the general population of application users deploys the second application 126(2) more frequently than the first application 126(1) for viewing and/or editing word processing files (e.g., ".DOCX" extension files). Thus, responsive to determining that a particular user-activity event 134 corresponds to the sharing user 130 editing a "shared" word processing file, the subscription prioritization engine 116 may prioritize fulfilling the second subscription 106(2) over the first subscription 106(1), since the second subscription 106(2) corresponds to the second application 126(2).

In some implementations, the application usage data 122 may indicate usage levels for one or more applications 126 on an individual user basis. For example, the application usage data 122 may indicate that a particular user that is associated with one or more of the client devices 124 deploys the second application 126(2) more frequently than the first application 126(1) for viewing and/or editing word processing files. Thus, responsive to the sharing user 130 sharing a word processing file in a manner that satisfies the first and second subscriptions 106 of the particular user's client devices 124, the subscription prioritization engine 116 may prioritize fulfilling the second subscription 106(2) over fulfilling the first subscription 106(1) due to the application usage data 122 indicating that the particular user prefers the second application 126(2) over the first application 126(1) (at least with respect to viewing and/or editing word processing data files).

In some implementations, the application usage data 122 may indicate usage levels for one or more applications 126 on an individual client device 124 basis. For example, the application usage data 122 may indicate that when both of the first and second applications 126 are installed on laptop and/or desktop style computing devices, a particular user and/or the general populace deploys the second application 126(2) more frequently than the first application 126(1) to view and/or edit word processing documents. In contrast, the same application usage data 122 may further indicate that the particular user and/or the general populace rarely deploys the second application 126(2) on smartphones and/or mobile type computing devices. Thus, responsive to the sharing user 130 sharing a word processing file, the subscription prioritization engine 116 may prioritize transmitting notifications to the second application 126(2) on a laptop computing device but may also prioritize transmitting notifications to the first application 126(1) on a smartphone computing device.

In various implementations, the subscription prioritization engine 116 may generate at least some of the application priority data 118 based on the application usage data 122. For example, based on determining that the second application 126(2) is used more frequently (e.g., by a particular user and/or by a general populace) for viewing and/or modifying content of ".DOCX" type data files, the subscription prioritization engine 116 may generate a priority rule within the application priority data 118 to prioritize fulfillment of the second subscription 106(2) over the first subscription 106(1) when the user-activity event 134 corresponds to a modification of a ".DOCX" type data file.

With respect to the data flow scenario of FIG. 1, a sharing user 130 is shown to deploy a computing device 132 to perform a user-activity event 134 with respect to a file hosting platform 136. Exemplary file hosting platforms 136 include, but are not limited to, SHAREPOINT and/or ONEDRIVE FOR BUSINESS by MICROSOFT CORPORATION, BOX, DROPBOX, GOOGLE DRIVE, or any other computing platform that is suitable for sharing and/or collaborating with respect to data files 140. It can be appreciated that under a variety of circumstances it may be appropriate to notify a particular user when the sharing user 130 performs certain activities with respect to data files 140 that are shared with the particular user. For example, it may be appropriate to respond to the sharing user 130 initially sharing the data file with the particular user by transmitting notifications 150 to client devices that are associated with the particular user.

Therefore, responsive to the sharing user 130 performing the user-activity event 134, the file hosting platform 136 may transmit to the subscription manager 102 event data 148 that describes aspects of the user-activity event 134. The event data 148 indicates at least some characteristics of the user-activity event 134 to enable the subscription manager 102 to determine whether the user-activity event 134 satisfies trigger criteria 114 for individual ones of the subscriptions 106. The event data 148 may include, for example, account data 138 indicating one or more users with whom the user-activity event 134 is shared, a file ID 144 that identifies the data file 140 that corresponds to the user-activity event 134, a file type 146 that indicates a format and/or file extension of the data file 140, and/or any other data that is suitable for use in prioritizing fulfillment of certain subscriptions 106 over other subscriptions.

In some implementations, the subscription manager 102 is configured to determine whether multiple subscriptions 106 within a subscription grouping for any particular client device 124 have been satisfied. If only a single subscription 106 is satisfied within a subscription grouping, then the subscription manager 102 may proceed to automatically fulfill this single subscription 106 by transmitting a single notification to a corresponding client device 124. In contrast, if the user-activity event 134 satisfies multiple subscriptions 106 within a subscription grouping for a particular client device 124, then the subscription manager 102 may deploy the subscription prioritization engine 116 to select a subset of these satisfied subscriptions 106 to fulfill. The subset may include a single subscription 106. Alternatively, the subset may include more than one subscription 106.

In the illustrated example, when multiple subscriptions 106 are satisfied within a subscription grouping for an individual client device 124, the subscription prioritization engine 116 selects a single "satisfied" subscription 106 for fulfillment such that individual client device(s) 124 receives only a single notification 150 responsive to a single user-activity event 134. As illustrated, the event data 148 informs the subscription manager 102 that the user-activity event 134 satisfies trigger criteria 114 for each of the first subscription 106(1), the second subscription 106(2), the fourth subscription 106(4), the fifth subscription 106(5), and the Nth subscription 106(N). Rather than fulfilling each satisfied subscription, which would result in duplicative notifications being sent to both the first client device 124(1) and the second client device 124(2), the subscription manager 102 selects and fulfills only a predefined subset of these satisfied subscriptions.

As illustrated with respect to the first client device 124(1), the subscription manager 102 selects the second subscription 106(2) for fulfillment over the first subscription 106(1). With respect to the second client device 124(2), the subscription manager 102 selects the fourth subscription 106(4) for fulfillment over the fifth subscription 106(5). Thus, in the example shown in FIG. 1, fulfilling the second subscription 106(2) results in a first notification 150(1) being transmitted to the instance of the second application 126(2) that is installed on the first client device 124(1), whereas fulfilling the fourth subscription 106(4) results in a second notification 150(2) being transmitted to the instance of the first application 126(1) that is installed on the second client device 124(2).

In some implementations, the subscription manager 102 may route the notifications 150 through a notification hub 152 that is configured to transmit notifications 150 to multiple different notification platforms 154. For example, as illustrated in FIG. 1, each of the first notification 150(1) and the second notification 150(2) are routed through a first notification platform 154(1) to the first client device 124(1) and the second client device 124(2), respectively. As further illustrated, an Nth notification 150(N) is routed through an Nth notification platform 150(N) that is different than the first notification platform 150(1). Exemplary notification platforms include, but are not limited to, WINDOWS NOTIFICATION SERVICE (WNS) that is configured to transmit "push" type notifications to WINDOWS devices, APPLE NOTIFICATION SERVICE that is configured to transmit "push" type notifications to APPLE devices, and GOOGLE CLOUD MESSAGING that is configured to transmit "push" type notifications to ANDROID devices. Stated plainly, the notification hub 152 may be configured to implement a service for abstracting platform specific details out of how the subscription manager 102 is required to communicate notifications to the various client devices 124. An exemplary notification hub 152 may include AZURE NOTIFICATION HUBS that is operated by MICROSOFT CORPORATION.

Figure 2:
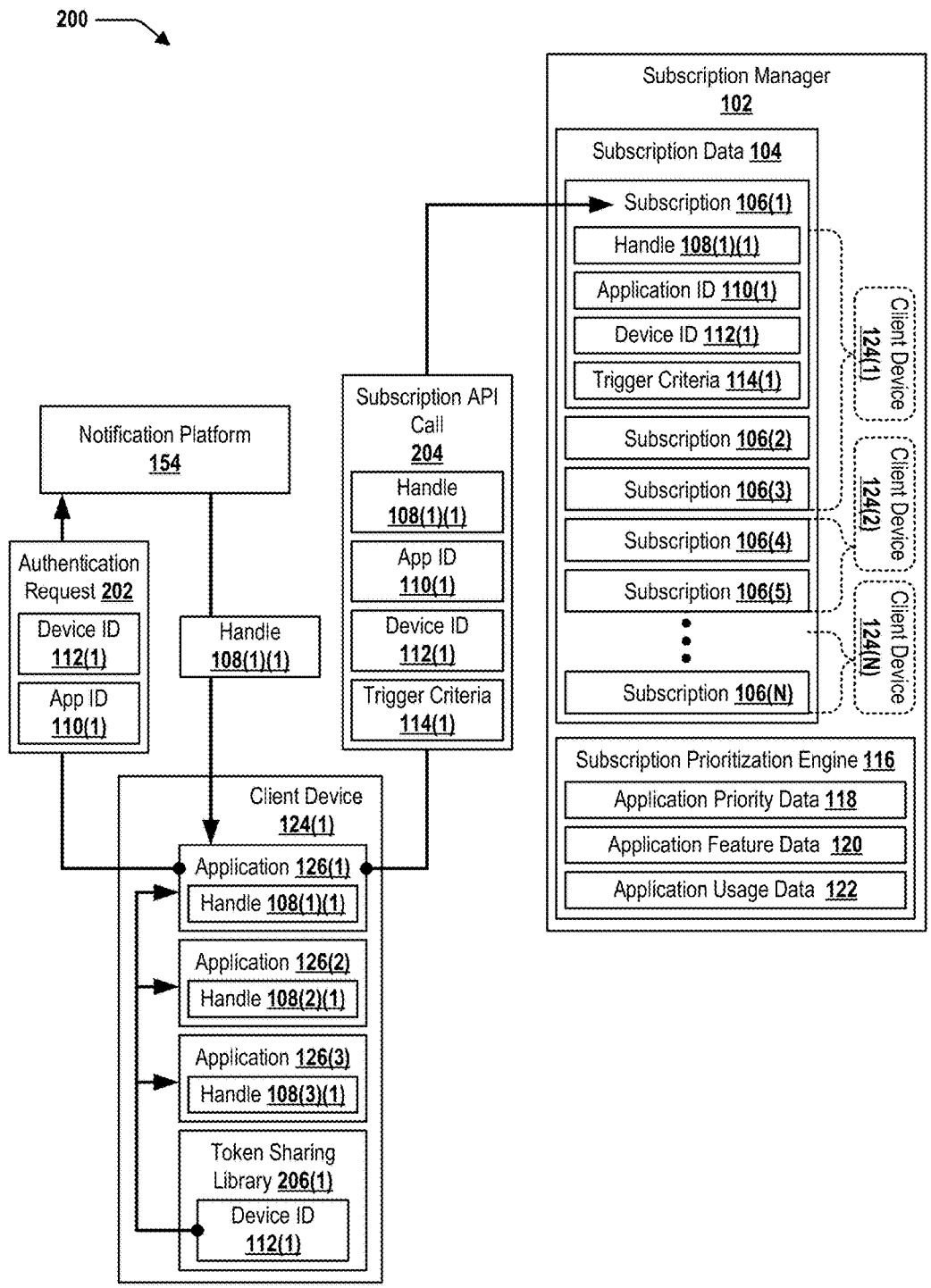
FIG. 2 illustrates an exemplary system for enabling an individual application to set up subscriptions using handles that are provided to the individual application by a notification platform.

Turning now to FIG. 2, illustrated is an exemplary system 200 for enabling individual applications 126 to set up subscriptions 106 at the subscription manager 102 using handles 108 that are provided to the individual application 126 by a notification platform 154. In the illustrated example, the instance of the first application 126(1) that is installed on the first client device 124(1) is shown to transmit an authentication request 202 to the notification platform 154. The authentication request 202 may include a first device ID 112(1) that uniquely identifies the first client device 124(1). Additionally, or alternatively, the authentication request 202 may include a first application ID 110(1) that uniquely identifies the first application 126(1).

The notification platform 154 then returns a handle 108(1)(1) to the requesting application (in the illustrated example the instance of the first application 126(1) that is installed on the first client device 124(1)). The handle 108(1)(1) that is returned may enable communications to be specifically addressed (e.g., directed, routed, etc.) to the requesting application 126. In some implementations, the handle 108 is returned to the requesting application 126 at the "calling" client device 124 in the form of a Uniform Resource Identifier (URI).

Once the handle 108(1)(1) is received, the first application 126(1) transmits a subscription API call 204 to instruct the subscription manager 102 to subscribe the first application 126(1) for notifications 150 as described herein. In the illustrated example, the subscription API call 204 causes the subscription manager 102 to add the first subscription 106(1) to a list of subscriptions that is defined in the subscription data 104. As illustrated, the subscription API call 204 may include the handle 108(1)(1) that was provided by the notification platform 154 to the "subscribing" application (i.e., instance of the first application 126(1) that is installed on the first client device 124(1)). In this way, the subscription manager 102 is enabled to store the handle 108(1)(1) in association with the first subscription 106(1) for addressing a notification 150 when a user-activity event 134 occurs that satisfies the first subscription 106(1).

Additionally, or alternatively, the subscription API call 204 may include the first application ID 110(1). In this way, the subscription manager 102 is enabled to determine which particular application (e.g., by application type, application title, or even application release version) each subscription 106 corresponds to. Then, in some implementations, the subscription prioritization engine 116 may prioritize fulfillment of some particular application(s) over other particular application(s). As a specific but non-limiting example, based on event data 148 indicating that the sharing user 130 has shared a word processing file, the subscription prioritization engine 116 may prioritize fulfillment of a second subscription 106(2) having an application ID 110(2) (not shown) that corresponds to a word processor over a first subscription 106(1) having the application ID 110(1) that corresponds to a file hosting program.

Additionally, or alternatively, the subscription API call 204 may include the device ID 112(1). In this way, the subscription manager 102 is enabled to determine which particular client device 124 each subscription 106 corresponds to. In some implementations, the subscription manager 102 may group the individual subscriptions 106 according to the device IDs 112 that are provided in the various subscription API calls 204. In this way, the subscription manager 102 is enabled to determine if multiple subscriptions 106 have been satisfied that are associated with a single client device 124.

Additionally, or alternatively, the subscription API call 204 may include trigger criteria 114 that defines user activity for triggering a notification 150 to be transmitted to a subscribing application 126. In some instances, the trigger criteria 114 that is provided in the subscription API call 204 may be "default" trigger criteria 114 that is pre-coded into the first application 126(1) upon installation on the first client device 124(1). For example, during an installation procedure on the first client device 124(1), the first application 126(1) may automatically generate the authentication request 202 and, after receiving the handle 108, further generate the subscription API call 204 to automatically subscribe to "push" notifications when certain "default" trigger criteria 114 are met. In some instances, the trigger criteria 114 that is provided in the subscription API call 204 may be "user-defined" trigger criteria 114. For example, a user of the first client device 124(1) may access a settings user interface that corresponds to the first application 126(1) to manually define one or more types of user activity for triggering a notification 150.

In some implementations, individual client devices 124 may include and manage a corresponding token sharing library 206 (e.g., a Token Broker) that enables a device ID 112 to be shared across multiple applications 126 on a single client device 124. An individual token sharing library 206 may be configured to communicate with multiple different applications 126 that are installed on a particular client device 124 for the purpose of sharing information and/or credentials across applications. For example, the first application 126(1) and the second application 126(2) may each be a component application of a productivity suite (e.g., MICROSOFT OFFICE, WORDPERFECT OFFICE X8, etc.) such that a user is able to use a single set of credentials (e.g., a username and password combination, etc.) to sign into either one of the first application 106(1) or the second application 106(2). In some instances, the token sharing library 206 is configured to share authentication tokens across multiple ones of the application 126 to expedite the user's ability to signed into multiple applications 126. For example, the token sharing library 206 may share an authentication token received from the first application 106(1) with the second application 106(2), and vice versa, so that upon signing into any one of the first or second applications a user will be automatically signed into both applications.

In some implementations, the token sharing library 206 may be configured to provide individual applications 126 that are installed on any particular client device 124 with a device ID 112 that corresponds to that particular client device 124. For example, as illustrated, a first token sharing library 206(1) is shown to store the first device ID 112(1) that uniquely identifies the first client device 124(1). Upon request, the token sharing library 206 may provide the first device ID 112(1) to individual ones of the applications 126 which may then append the provided first device ID 112(1) into the subscription API call 204. Under circumstances where an application 126 requests a device ID 112 from the token sharing library 206 before the token sharing library 206 has a device ID 112, the token sharing library 206 may access one or more registers and/or libraries (not shown) of the client device 124 in order to obtain a device ID 112. Additionally, or alternatively, the token sharing library 206 may generate a device ID 112 for a particular client device 124 in response to an application 126 requesting the same when no device ID 112 yet exists for the particular device 124 at the token sharing library 206.

In some implementations, once a device ID 112 is stored in association with the token sharing library 206, then each time that an application 126 is initiated (e.g., upon startup of the client device 124, etc.) the token sharing library 206 may provide the same device ID 112 to that application 126. For example, each time an application 126 is initiated it may send a request for the device ID 112 to the token sharing library 206 which then provides the "stored" device ID 112 to the "requesting" application 126. This pattern may be repeated for each application 126 that is installed on the client device 124 so that each application 126 appends the same device ID 112 to any generated subscription API calls 204.

In some implementations, the token sharing library 206 may save the device ID 112 in association with account settings of the individual applications 126. In this way, once an individual application 126 generates a subscription API call 204 using the device ID 112, this application 126 can be uninstalled and subsequently re-installed onto the client device 124 and the same device ID 112 will remain associated with the application 126 even after reinstallation. In this way, the techniques described herein may mitigate a need to re-register an application 126 if that application 126 is removed and reinstalled on the client device 124 and/or if the version of the application is updated at the client device 124.

Turning now to FIG. 3, illustrated is exemplary subscription data 300 for use by the subscription manager 102 to prevent a user-activity event 134 from triggering transmission of duplicative notifications to individual client devices 124. The exemplary subscription data 300 may arrange (e.g., group) individual subscriptions 106 according to whichever client device 124 the subscriptions 106 are associated with. For example, as illustrated, the first subscription 106(1) through the third subscription 106(3) are grouped together due to their being commonly associated with the first client device 124(1), the fourth subscription 106(4) and the fifth subscription 106(5) are grouped together due to their being commonly associated with the second client device 124(2), and so on. As illustrated, the individual subscriptions 106 may include a device ID 112 to enable the subscription manager 102 to arrange the subscriptions 106 according to each device and/or to determine when a single user-activity event 134 satisfies multiple subscriptions 106 that are associated with any one device. Exemplary device IDs include, but are not limited to, Unique Device Identifier (UDID) character strings, International Mobile Equipment Identity (IMEI) numbers, a Host Name (e.g., a unique identifier that serves as a computer name), or any other suitable identification type.

In various instances, the subscription manager 102 may recognize associations between a single client device 124 and multiple different device IDs 112. As illustrated, for example, the first client device 124(1) is uniquely identifiable by both the IMEI name of "123" and also the Hostname of "DESKTOP 1." In this way, the subscription manager 102 may effectively group subscriptions 106 according to client devices 124 even when subscription API calls 204 are received from different applications 126 on the same client device 124, but which use different device IDs 112 to identify the same client device 124. For example, suppose that the third application 106(3) lacks permissions for (or is otherwise incapable of) accessing an IMEI number for a client device 124, whereas the first application 106(1) provides this IMEI number in a subscription API call 204 as the first device ID 112(1). Further suppose that the third application 106(3) is capable of accessing a Host Name of the client device 124. In this example, since each of the Host Name "DESKTOP_1" and the IMEI number of "123" are usable to uniquely identify the first client device 124(1), subscriptions 106 which contain either of these two different pieces of information may be commonly grouped in association with the first client device 124(1). In some implementations, applications 126 which lack an ability to communicate with the token sharing library 206 (e.g., due to being a legacy application that lacks certain capabilities of WINDOWS UNIVERSAL APPLICATIONS) may be caused to identify their corresponding client device 124 using a host name rather than a device ID 112 that is brokered by the token sharing library 206.

As illustrated, each subscription 106 may have a corresponding subscription ID to enable the subscription manager 102 to distinguish each individual subscription 106 from other subscriptions 106. The subscription IDs may be useful to the subscription manager 102 for assigning which individual subscriptions to fulfill and/or refrain from fulfilling in response to any particular user-activity event 134. Individual subscriptions 106 may each further include a corresponding handle 108 for addressing notifications 150.

As illustrated, the individual subscriptions 106 may include an application ID 110 that uniquely identifies a corresponding application 106 that set up the subscription 106. In the illustrated example, the application IDs 110 identify the individual applications 126 by name (e.g., tradename MICROSOFT WORD, tradename MICROSOFT ONEDRIVE, etc.) to enable the subscription manager 102 to recognize characteristics of the applications 126 that correspond to each subscription 106. In this way, the subscription prioritization engine 116 may select an individual "satisfied" subscription 106 for fulfillment over other "satisfied" subscriptions 106 based on differences between the applications 126 to which multiple different "satisfied" subscriptions correspond.

As a specific but nonlimiting example, under circumstances where a user-activity event 134 corresponds to a sharing user 130 adding a comment to a ".DOCX" type data file, the subscription manager 102 may determine that both of first trigger criteria 114(1) corresponding to the first subscription 106(1) and second trigger criteria 114(2) corresponding to the second subscription 106(2) are both satisfied. Based on the first application ID 110(1) (e.g., that identifies the "File Hosting Program") and the second application ID 110(2) (e.g., that identifies the "Word Processor"), the subscription prioritization engine 116 may compare capabilities of these two applications 126 and determine that only the second application 126(2) is capable of rendering the comment added by the sharing user 130. Accordingly, the subscription prioritization engine 116 may select the second subscription 106(2) over the first subscription 106(1) for fulfillment responsive to the comment being added.

In some implementations, the subscription prioritization engine 116 may be configured to determine relative degrees of specificity with which a particular user-activity event 134 has satisfied multiple different subscriptions 106. Then, the subscription prioritization engine 116 may select a particular "satisfied" subscription to fulfill based on the relative degrees of specificity. For example, as illustrated, the first subscription 106(1) defines first trigger criteria 114(1) as a "shared" data file 140 (e.g., a file that is shared with a user account that corresponds to the first client device 124(1)) of any type being "initially" shared, edited, or viewed by a sharing user 130 whereas the second subscription 106(2) defines second trigger criteria 114(2) more specifically as a sharing user 130 performing any of these same activities but with respect to a word processing data file (e.g., a ".DOC," ".DOCX," or a ".DOCM" type data file). Thus, if a user-activity event 134 corresponds to a sharing user 130 editing a ".DOCX" type data file then, the subscription prioritization engine 116 may determine that the second subscription 106(2) has been satisfied with a higher degree of specificity than the first subscription 106(1). In a sense, the first subscription 106(1) is over-inclusive as compared to the second subscription 106(2) in the sense that if the second subscription 106(2) is satisfied then the first subscription 106(1) is also satisfied but if the first subscription 106(1) is satisfied then the second subscription 106(2) is not necessarily also satisfied. Therefore, due to the second subscription 106(2) being satisfied more specifically than the first subscription 106(1), the subscription prioritization engine 116 may select the second subscription 106(2) for fulfillment over the first subscription 106(1).

Figure 4B:
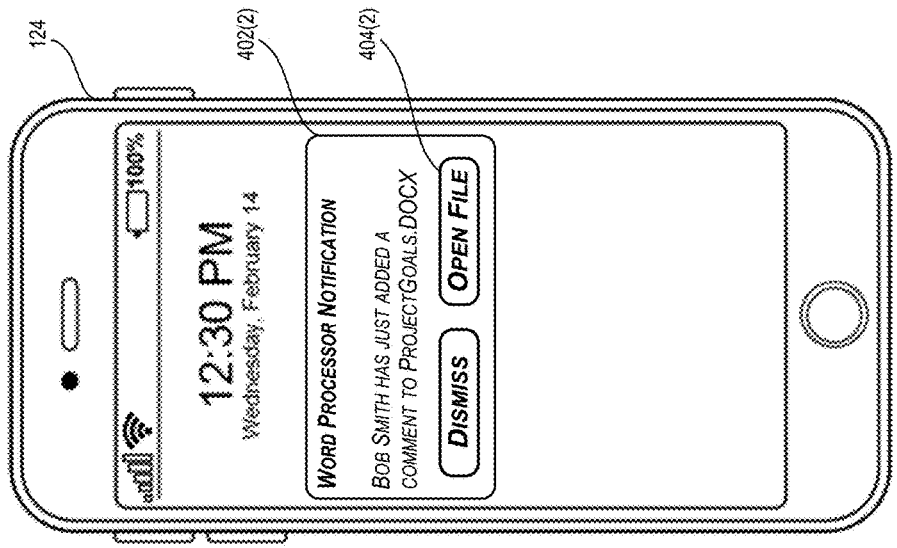
FIG. 4B illustrates an exemplary notification GUI that shows only a single rendered notification notwithstanding that multiple applications are installed on the client device having corresponding subscriptions that are satisfied by the single user-activity event.
Figure 4A:
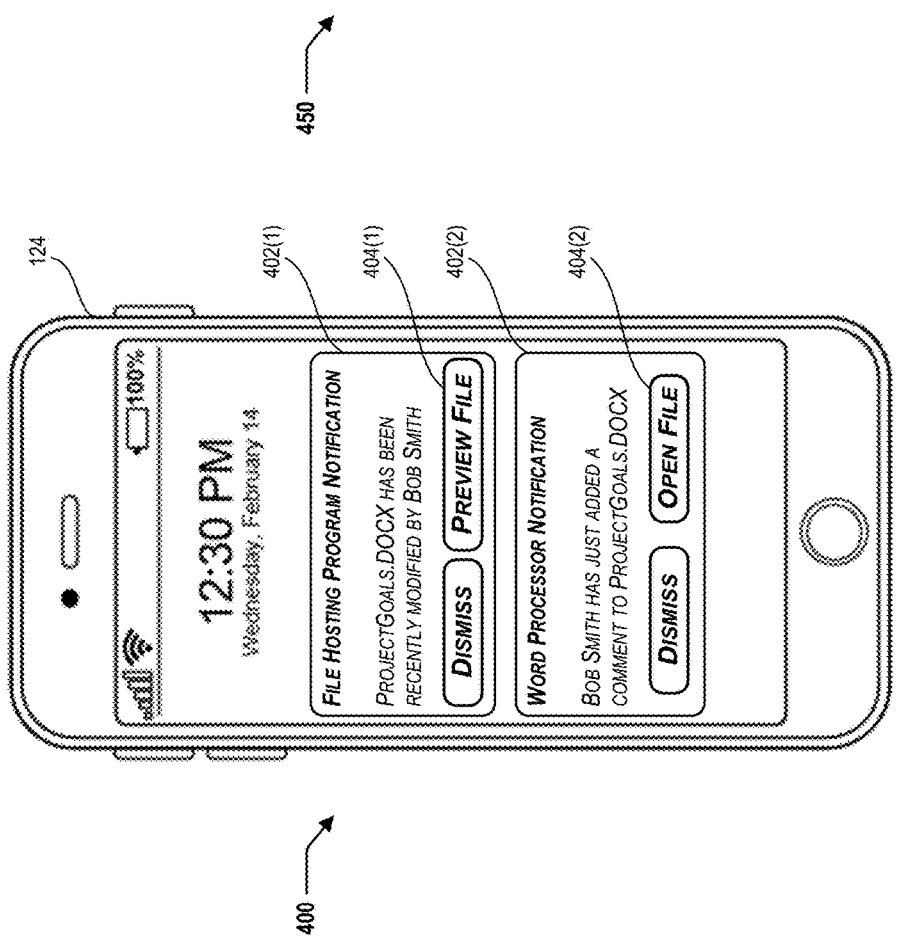
FIG. 4A illustrates an exemplary notification graphical user interface (GUI) that shows duplicative rendered notifications of a single user-activity event.

Turning now to FIG. 4A, illustrated is an exemplary notification graphical user interface (GUI) 400 that is showing duplicative rendered notifications 402 of a single user-activity event 134 at a client device 124. As illustrated, the exemplary notification GUI 400 is actively displaying a first rendered notification 402(1) in association with a first application (e.g., the file hosting program) to inform a user that Bob Smith has modified a particular shared data file 140. As further illustrated, the exemplary notification GUI 400 is also actively displaying a second rendered notification 402(2) in association with a second application (e.g., the word processor) to redundantly inform the same user that Bob Smith has modified this particular shared data file 140. It can be appreciated that these two rendered notifications 402 are duplicative in the sense that they each are generated responsive to the same user-activity event 134 at the same client device 124. Accordingly, in addition to the unfortunate increase in network traffic used to inform the user of the same single user-activity event 134, the client device 124 has been caused to perform a greater amount of processing cycles (e.g., at a graphical processing unit and/or a central processing unit) than needed to adequately inform the user of the single user-activity event 134.

In the illustrated example, the user of the client device 124 may activate the first rendered notification 402(1) (e.g., by selecting a "Preview File" user interface element 404(1) thereof) to cause the file hosting program to render a preview of the modified version of the ProjectGoals.DOCX data file. For example, a particular notification 150 that corresponds to the first rendered notification 402(1) may be received by an operating system (OS) of the client device 124. The handle 108 that is included in the particular notification 150 may serve as a pointer to the file hosting program so that upon selecting the "Preview File" user interface element 404(1) the OS is caused to launch the File Hosting Program to render a preview of the modified version of the Project-Goals.DOCX data file. As further illustrated, the user of the client device 124 may activate the second rendered notification 402(2) (e.g., by selecting an "Open File" user interface element 404(2) thereof) to cause the word processor to open the modified version of the ProjectGoals.DOCX data file.

As described above, for purposes of the present discussion, the file hosting program might not be compatible with specific feature of the word processor for adding and/or viewing comments. Thus, if the user of the client device 124 activates the first rendered notification 402(1) by selecting the preview file user interface element 404(1), the comments that were added to the ProjectGoals.DOCX data file may unfortunately remain imperceptible to the user of the client device 124. Thus, under the exemplary circumstances of the present discussion, it can be appreciated that activating the second rendered notification 402(2) by selecting the open file user interface element 404(2) may be a more suitable option than activating the first rendered notification 402(1) for the user to become apprised as to what specific comments have been added to the ProjectGoals.DOCX data file.

Accordingly, FIG. 4B illustrates an exemplary notification GUI 450 that is showing only a single rendered notification 402 notwithstanding multiple applications 126 that are installed on the client device 124 having corresponding subscriptions 106 that are satisfied by the single user-activity event 134. For purposes of the present discussion, the subscriptions 106 maintained for the client device 124 are identical in both FIG. 4A and FIG. 4B. Moreover, in both FIGS. 4A and 4B, the subscription manager 102 has received the event data 148 indicating that multiple subscriptions 106 associated with the client device 124 have been satisfied. In contrast to FIG. 4A, however, rather than indiscriminately fulfilling each of the multiple satisfied subscriptions 106, in FIG. 4B the subscription manager 102 has selected an individual one of the multiple satisfied subscriptions 106 to fulfill. For example, due to the file hosting program being incapable of showing the added comments, under these exemplary circumstances the subscription manager 102 has determined that the word processor has priority over the file hosting program for receiving notifications of comments being added to ".DOCX" type data files. Accordingly, in FIG. 4B the subscription manager 102 has fulfilled the word processor's satisfied subscription but has refrained from fulfilling the file hosting program's satisfied subscription.

Figure 5:
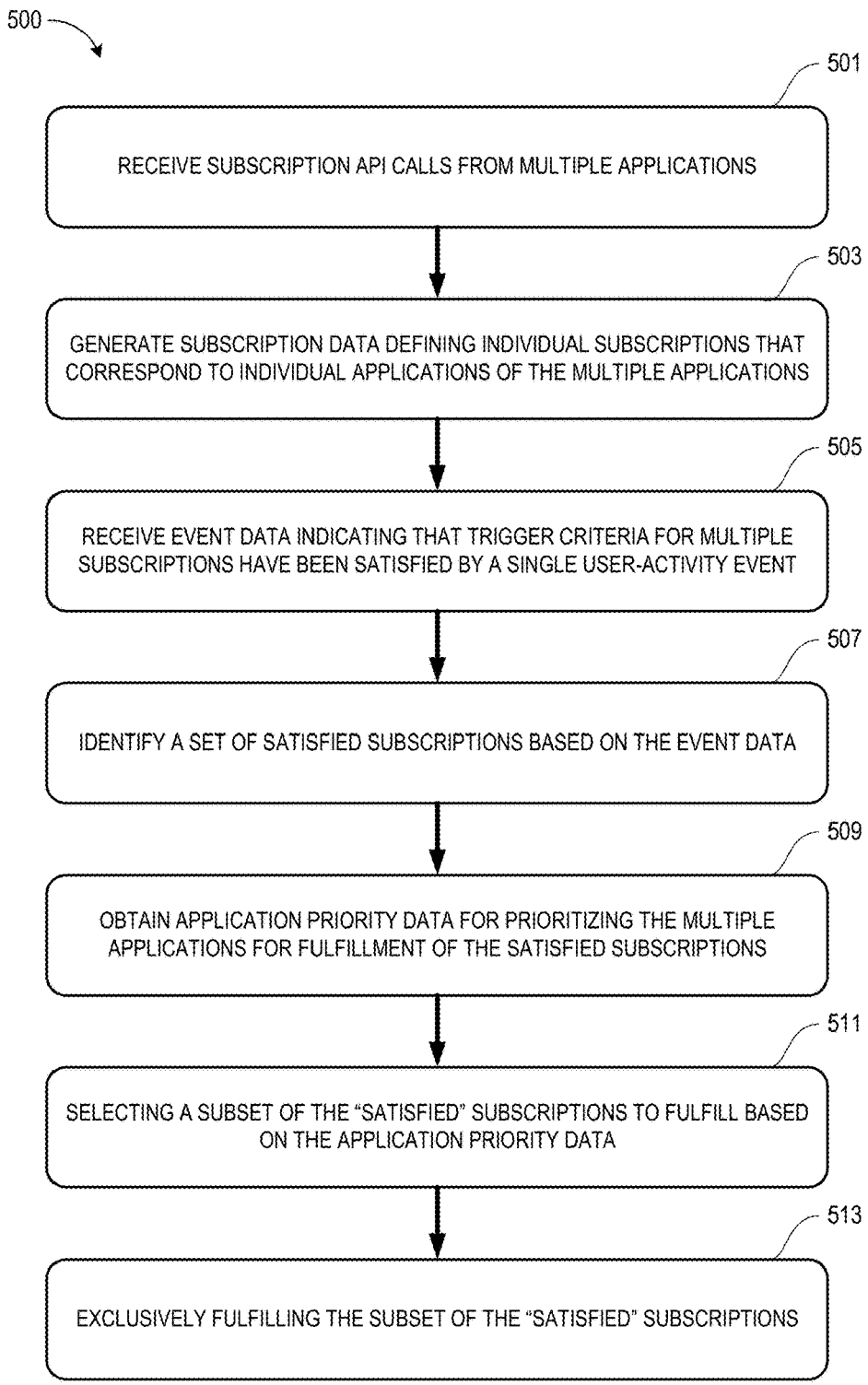
FIG. 5 is a flow diagram of an example method for preventing a user-activity event from triggering transmission of duplicative notifications to more than one application on one or more client devices.

FIG. 5 is a flow diagram of an example method 500 for preventing a user-activity event from triggering transmission of duplicative notifications to more than one application on one or more client devices. The process 500 is described with reference to FIGS. 1-4B. The process 500 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

At block 501, a computing system may receive subscription API calls 204 from multiple applications 126. As described above, the subscriptions API calls 204 may include one or more of handles 108, application IDs 110, device IDs 112, or trigger criteria 114. As shown in FIG. 1, the multiple applications 126 may be installed across multiple different client devices 124. Alternatively, the multiple applications 126 may be installed on a single client device 124.

At block 503, the system may generate subscription data 104 that defines multiple individual subscriptions 106 that correspond to individual ones of the multiple applications 126. In instances where the multiple applications 126 are installed across multiple client devices 126, the system may arrange the individual subscriptions 106 according to device ID 112. For example, as shown in FIG. 1, all subscriptions 106 for the first client device 124(1) may be grouped together, all subscriptions 106 for the second client device 124(2) may be grouped together, and so on. It can be appreciated that grouping or otherwise associating subscriptions 106 that are commonly associated with a single client device 124 may enable the system to efficiently determine when multiple subscriptions 106 for any single client device 124 have been satisfied by a single user-activity event 134. Then, in some cases, the system may select a single one of these satisfied subscriptions to fulfill so that duplicative notifications 150 are not transmitted to a single client device 124.

At block 505, the system may receive event data that indicates that a single user-activity event 134 (e.g., a user sharing a data file 140, etc.) has satisfied multiple subscriptions 106. In some instances, the single user-activity event 134 may correspond to a share event where the data file 140 is initially shared by the sharing user 130 with a user identifier that corresponds to a client device 124 that corresponds to one or more subscriptions 106. In some instances, the single user-activity event 134 may correspond to a view event where a data file 140 that is shared with a user of one or more client devices 124 is viewed at a different computing device by a different user. For example, the sharing user 130 viewing the data file 140 at the computing device 132 may satisfy multiple subscriptions that, absent the techniques described herein, would result in duplicative notifications being sent to a single client device 124 (as shown in FIG. 4A) and/or a single group of client devices 124 that are associated with the subscriptions 106. In some instances, the single user-activity event 134 may correspond to an edit event where the data file 140 is edited by the sharing user 130 at the computing device 132.

At block 507, the system may identify a set of satisfied subscriptions based on the event data 148. For example, the system may determine whether characteristics of the single user-activity event 134 satisfy trigger criteria 114 for multiple individual ones of the subscriptions 106.

At block 509, the system may obtain application priority data 118 that is usable to prioritize the multiple applications for fulfillment of the satisfied subscriptions. For example, the system may determine that the user-activity event corresponds to a file type 146 for which a particular application 126, of those corresponding to the set of satisfied subscriptions, is used most frequently to open (e.g., based on application usage data 122). As another example, the application priority data 118 may include one or more rules that are manually predefined by the user to cause the subscription manager 102 to prioritize one particular application 126 over other applications 126 when the sharing user 130 shares a particular type of data file.

At block 511, the system may select a subset of the satisfied subscriptions to fulfill based on the application priority data 118 (which may include and/or be generated based on the application feature data 120 and/or application usage data 122). In some implementations, the system may select a single satisfied subscription to fulfill per client device 124. Thus, as shown in the example data flow scenario of FIG. 1, if two subscriptions are fulfilled with respect to each of a first client device 124(1) and a second device 124(2), only a single notification 150 will be generated for and/or transmitted to each of these two client devices 124.

At block 513, the system may exclusively fulfill the subset of the satisfied subscriptions 106. Exclusively fulfilling the subset of the satisfied subscriptions may include causing one or more notifications to be transmitted in associating with the subset of the satisfied subscriptions. Additionally, or alternatively, exclusively fulfilling the subset of the satisfied subscriptions may include preventing notifications from being transmitted in associating with an unselected remainder of the satisfied subscriptions.

Figure 6:
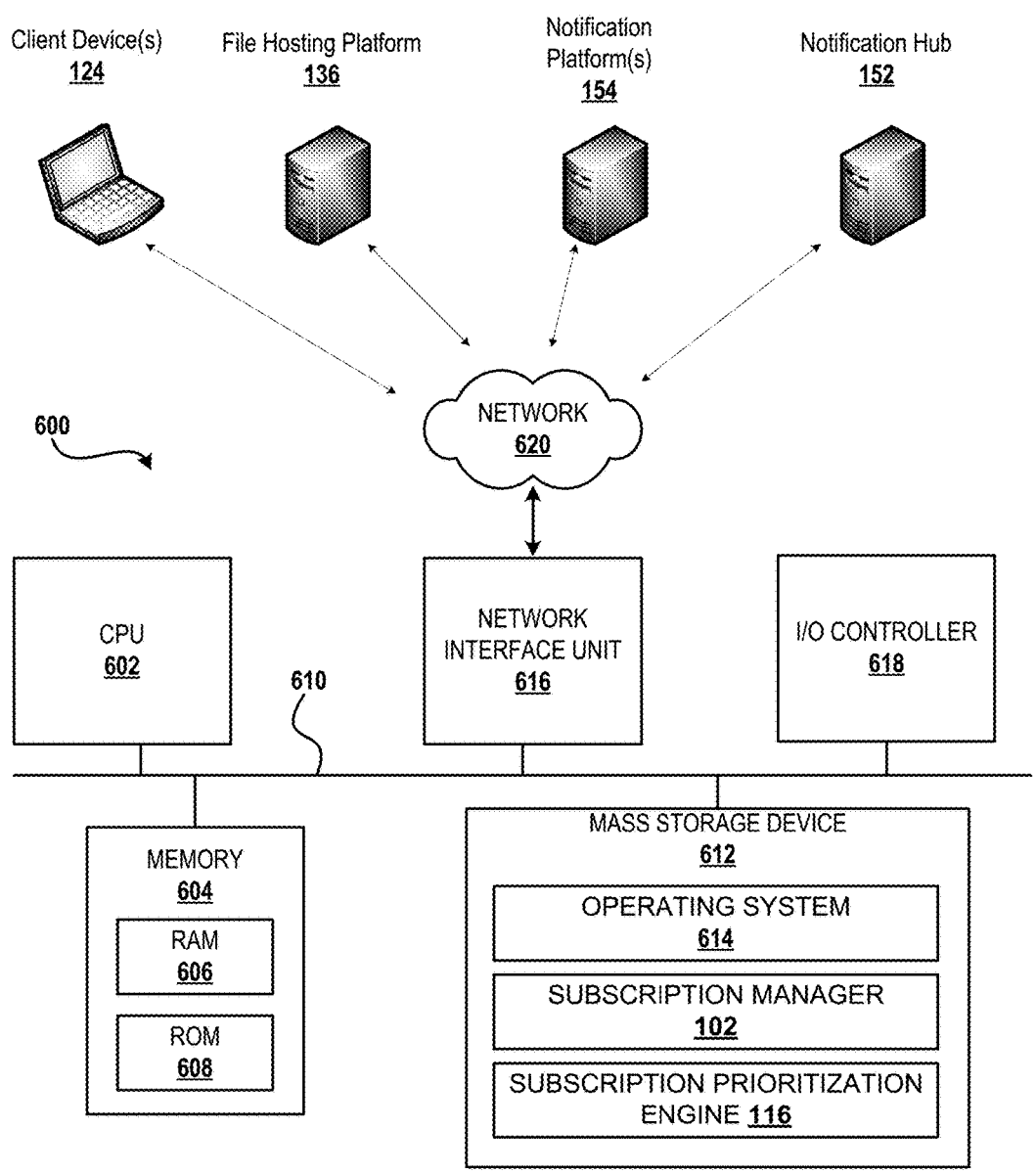
FIG. 6 shows additional details of an example computer architecture for a computer capable of executing the techniques disclosed herein.

FIG. 6 shows additional details of an example computer architecture 600 for a computer capable of executing the subscription manager 102, the subscription prioritization engine 116, and/or any program components thereof as described herein. Thus, the computer architecture 600 illustrated in FIG. 6 illustrates an architecture for a client device, a server computer, or network of server computers, or any other types of computing devices suitable for implementing the functionality described herein. The computer architecture 600 may be utilized to execute any aspects of the software components presented herein.

The computer architecture 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 614, other data, and one or more application programs. The mass storage device 612 may further include one or more of the subscription manager 102, and the subscription prioritization engine 116.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various techniques, the computer architecture 600 may operate in a networked environment using logical connections to remote computers through a network 850 and/or another network (not shown). The computer architecture 600 may connect to the network 850 through a network interface unit 616 connected to the bus 610. It should be appreciated that the network interface unit 616 also may be utilized to connect to other types of networks and remote computer systems. The computer architecture 600 also may include an input/output controller 618 for receiving and processing input from a number of other devices, including a keyboard, mouse, or electronic stylus (not shown in FIG. 6). Similarly, the input/output controller 618 may provide output to a display screen, a printer, or other type of output device (also not shown in FIG. 6). It should also be appreciated that via a connection to the network 620 through a network interface unit 616, the computing architecture may enable the subscription manager 102 to communicate with one or more of the client device(s) 124, the file hosting platform 136, the notification platform(s) 154, or the notification hub 152.

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

EXAMPLE CLAUSES

The disclosure presented herein may be considered in view of the following clauses.

Example Clause A, a computer-implemented method for preventing a user-activity event from triggering transmission of duplicative notifications to multiple applications that are installed on a client device, the computer-implemented method comprising: obtaining subscription data defining a plurality of subscriptions that correspond to the multiple applications, wherein individual subscriptions include trigger criteria defining user activity for triggering transmission of individual notifications to the client device in association with individual applications; obtaining application priority data that indicates predefined user-activity event characteristics for prioritizing a first application over a second application for transmission of a notification; receiving event data that indicates characteristics of the user-activity event, wherein the characteristics satisfy first trigger criteria of a first subscription that corresponds to the first application, and second trigger criteria of a second subscription that corresponds to the second application; and based on the characteristics of the user-activity event corresponding to the predefined user-activity event characteristics: fulfilling the first subscription to cause transmission of the notification to the client device in association with the first application, and refraining from fulfilling the second subscription to prevent transmission of a duplicative notification to the client device in association with the second application.

Example Clause B, the computer-implemented method of Example Clause A, further comprising: generating the individual subscriptions based on a plurality of subscription application programming interface (API) calls that are received from the client device, wherein individual subscription API calls indicate individual application identifiers (IDs) that identify the individual applications; and generating the application priority data based at least in part on the individual application IDs.

Example Clause C, the computer-implemented method of any one of Example Clauses A though B, further comprising: obtaining application feature data indicating that, in comparison to the first application, the second application includes a relatively higher number of features that are designed for accessing content of a data file that is associated with the user-activity event; and generating the application priority data based at least in part on the application feature data.

Example Clause D, the computer-implemented method of any one of Example Clauses A though C, further comprising:

obtaining application usage data indicating the first application is associated with a relatively higher usage level as compared to the second application; and generating the application priority data based at least in part on the application usage data.

Example Clause E, the computer-implemented method of any one of Example Clauses A though D, further comprising: analyzing the event data with respect to the subscription data to determine when the characteristics satisfy the first trigger criteria and the second trigger criteria; and responsive to determining that the characteristics satisfy the first trigger criteria and the second trigger criteria, determining whether the characteristics of the user-activity event match the predefined user-activity event characteristics.

Example Clause F, the computer-implemented method of any one of Example Clauses A though E, further comprising: determining whether the first subscription and the second subscription are commonly associated with the client device; and responsive to the first subscription and the second subscription being commonly associated with the client device, determining whether the characteristics of the user-activity event match the predefined user-activity event characteristics.

Example Clause G, the computer-implemented method of any one of Example Clauses A though F, wherein the characteristics include at least an event type of the user-activity event, and wherein the event type corresponds to at least one of: a share event wherein a data file is initially associated with a user identifier that corresponds to the client device, a view event wherein the data file is viewed at a second client device that is different than the first client device, or an edit event wherein the data file is edited at the second client device that is different than the first client device.

Example Clause H, the computer-implemented method of any one of Example Clauses A though G, wherein the characteristics include at least a content type of a data file that is associated with the user-activity event.

Example Clause I, a system comprising: one or more processors; a memory in communication with the one or more processors, the memory having computer-readable instructions stored thereupon which, when executed by the one or more processors, cause the one or more processors to: receive a plurality of subscription application programming interface (API) calls from a plurality of applications that are installed on at least one client device, wherein individual subscription API calls include individual handles for addressing individual notifications; generate, based on the plurality of subscription API calls, subscription data defining a plurality of subscriptions that correspond to the plurality of applications; determine that a user-activity event has satisfied: first trigger criteria of a first subscription that corresponds to a first application, and second trigger criteria of a second subscription that corresponds to a second application; obtain application priority data for prioritizing the first application with respect to the second application for transmission of a notification of the user-activity event; and based on the application priority data: fulfill the first subscription to cause transmission of the notification to the first application, and refrain from fulfilling the second subscription to prevent transmission of a duplicative notification to the second application.

Example Clause J, the system of Example Clause I, wherein the computer-readable instructions further cause the one or more processors to: determine that the first subscription and the second subscription are commonly associated with an individual client device of the at least one client device, wherein refraining from fulfilling the second subscription is based on the first subscription and the second subscription being commonly associated with the individual client device.

Example Clause K, the system of any one of Example Clauses I though J, wherein the individual subscription API calls include individual device IDs for identifying individual client devices from where individual applications originate the individual subscription API calls.

Example Clause L, the system of any one of Example Clauses I though K, wherein generating the subscription data includes arranging the plurality of subscriptions into individual subscription groupings that correspond to the individual client devices.

Example Clause M, the system of any one of Example Clauses I though L, wherein the computer-readable instructions further cause the one or more processors to: determine a relative degree of specificity with which the user-activity event has satisfied the first trigger criteria as compared to the second trigger criteria; and selecting the first subscription for fulfillment over the second subscription based on the relative degree of specificity.

Example Clause N, the system of any one of Example Clauses I though M, wherein the application priority data is defined to prioritize the first application over the second application for transmission of the notification based on a file type associated with the user-activity event.

Example Clause O, the system of any one of Example Clauses I though N, wherein the computer-readable instructions further cause the one or more processors to: generate the application priority data based on at least one of: application usage data indicating a relative usage level of the first application as compared to the second application, or application feature data indicating feature differences of the first application as compared to the second application.

Example Clause P, the system of any one of Example Clauses I though O, wherein the computer-readable instructions further cause the one or more processors to: generate the application priority data based on application usage data indicating at least one of: a relative usage level within a general population of the first application as compared to the second application; or a relative usage level by a particular user of the first application as compared to the second application.

Example Clause Q. A computer-implemented method, comprising: generating subscription data defining a plurality of subscriptions that correspond to multiple applications, wherein individual subscriptions include trigger criteria defining user activity for triggering transmission of individual notifications, and wherein the trigger criteria for multiple ones of the individual subscriptions at least partially overlaps; receiving event data indicating that the trigger criteria for the multiple ones of the individual subscriptions have been satisfied by a single user-activity event; analyzing the event data with respect to the subscription data to identify a set of satisfied subscriptions; obtaining application priority data for prioritizing fulfillment of the satisfied subscriptions; and selecting, based on the application priority data, a subset of the satisfied subscriptions for fulfillment.

Example Clause R, the computer-implemented method of Example Clause Q, further comprising: exclusively fulfilling the subset of the satisfied subscriptions by: causing one or more notifications to be transmitted in associating with the subset of the satisfied subscriptions; and preventing notifications from being transmitted in associating with an unselected remainder of the satisfied subscriptions.

Example Clause S, the computer-implemented method of any one of Example Clauses Q though R, wherein the selecting the subset of the satisfied subscriptions includes selecting a predetermined number of the satisfied subscriptions to fulfill for each individual client device.

Example Clause T, the computer-implemented method of any one of Example Clauses Q though S, further comprising: transmitting at least one individual notification to a notification hub based on the subset of the satisfied subscriptions; and refraining from transmitting other notifications to the notification hub based on other ones of the satisfied subscriptions that are omitted from the subset.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method for preventing a user-activity event from triggering transmission of duplicative notifications to multiple applications that are installed on a client device, the computer-implemented method comprising:
   obtaining subscription data defining a plurality of subscriptions that correspond to the multiple applications, wherein individual subscriptions include trigger criteria defining user activity for triggering transmission of individual notifications to the client device in association with individual applications;
   obtaining application priority data that indicates predefined user-activity event characteristics for prioritizing a first application over a second application for transmission of a notification;
   receiving event data that indicates characteristics of the user-activity event, wherein the characteristics satisfy first trigger criteria of a first subscription that corresponds to the first application, and second trigger criteria of a second subscription that corresponds to the second application; and
   based on the characteristics of the user-activity event corresponding to the predefined user-activity event characteristics:
      fulfilling the first subscription to cause transmission of the notification to the client device in association with the first application, and
      refraining from fulfilling the second subscription to prevent transmission of a duplicative notification to the client device in association with the second application.

2. The computer-implemented method of claim 1, further comprising:
   generating the individual subscriptions based on a plurality of subscription application programming interface (API) calls that are received from the client device, wherein individual subscription API calls indicate individual application identifiers (IDs) that identify the individual applications; and
   generating the application priority data based at least in part on the individual application IDs.

3. The computer-implemented method of claim 1, further comprising:
   obtaining application feature data indicating that, in comparison to the first application, the second application includes a relatively higher number of features that are designed for accessing content of a data file that is associated with the user-activity event; and
   generating the application priority data based at least in part on the application feature data.

4. The computer-implemented method of claim 1, further comprising:
   obtaining application usage data indicating the first application is associated with a relatively higher usage level as compared to the second application; and
   generating the application priority data based at least in part on the application usage data.

5. The computer-implemented method of claim 1, further comprising:
   analyzing the event data with respect to the subscription data to determine when the characteristics satisfy the first trigger criteria and the second trigger criteria; and
   responsive to determining that the characteristics satisfy the first trigger criteria and the second trigger criteria, determining whether the characteristics of the user-activity event match the predefined user-activity event characteristics.

6. The computer-implemented method of claim 1, further comprising:
   determining whether the first subscription and the second subscription are commonly associated with the client device; and
   responsive to the first subscription and the second subscription being commonly associated with the client device, determining whether the characteristics of the user-activity event match the predefined user-activity event characteristics.

7. The computer-implemented method of claim 1, wherein the characteristics include at least an event type of the user-activity event, and wherein the event type corresponds to at least one of:
   a share event wherein a data file is initially associated with a user identifier that corresponds to the client device,
   a view event wherein the data file is viewed at a second client device that is different than the first client device, or
   an edit event wherein the data file is edited at the second client device that is different than the first client device.

8. The computer-implemented method of claim 1, wherein the characteristics include at least a content type of a data file that is associated with the user-activity event.

9. A system comprising:
   one or more processors;
   a memory in communication with the one or more processors, the memory having computer-readable instructions stored thereupon which, when executed by the one or more processors, cause the one or more processors to:
      receive a plurality of subscription application programming interface (API) calls from a plurality of applications that are installed on at least one client device, wherein individual subscription API calls include individual handles for addressing individual notifications;
      generate, based on the plurality of subscription API calls, subscription data defining a plurality of subscriptions that correspond to the plurality of applications;
      determine that a user-activity event has satisfied:

first trigger criteria of a first subscription that corresponds to a first application, and
second trigger criteria of a second subscription that corresponds to a second application;
obtain application priority data for prioritizing the first application with respect to the second application for transmission of a notification of the user-activity event; and
based on the application priority data:
fulfill the first subscription to cause transmission of the notification to the first application, and
refrain from fulfilling the second subscription to prevent transmission of a duplicative notification to the second application.

10. The system of claim 9, wherein the computer-readable instructions further cause the one or more processors to:
determine that the first subscription and the second subscription are commonly associated with an individual client device of the at least one client device, wherein refraining from fulfilling the second subscription is based on the first subscription and the second subscription being commonly associated with the individual client device.

11. The system of claim 9, wherein the individual subscription API calls include individual device IDs for identifying individual client devices from where individual applications originate the individual subscription API calls.

12. The system of claim 9, wherein generating the subscription data includes arranging the plurality of subscriptions into individual subscription groupings that correspond to the individual client devices.

13. The system of claim 9, wherein the computer-readable instructions further cause the one or more processors to:
determine a relative degree of specificity with which the user-activity event has satisfied the first trigger criteria as compared to the second trigger criteria; and
selecting the first subscription for fulfillment over the second subscription based on the relative degree of specificity.

14. The system of claim 9, wherein the application priority data is defined to prioritize the first application over the second application for transmission of the notification based on a file type associated with the user-activity event.

15. The system of claim 9, wherein the computer-readable instructions further cause the one or more processors to:
generate the application priority data based on at least one of:
application usage data indicating a relative usage level of the first application as compared to the second application, or
application feature data indicating feature differences of the first application as compared to the second application.

16. The system of claim 9, wherein the computer-readable instructions further cause the one or more processors to:
generate the application priority data based on application usage data indicating at least one of:
a relative usage level within a general population of the first application as compared to the second application; or
a relative usage level by a particular user of the first application as compared to the second application.

17. A computer-implemented method, comprising:
generating subscription data defining a plurality of subscriptions that correspond to multiple applications, wherein individual subscriptions include trigger criteria defining user activity for triggering transmission of individual notifications, and wherein the trigger criteria for multiple ones of the individual subscriptions at least partially overlaps;
receiving event data indicating that the trigger criteria for the multiple ones of the individual subscriptions have been satisfied by a single user-activity event;
analyzing the event data with respect to the subscription data to identify a set of satisfied subscriptions;
obtaining application priority data for prioritizing fulfillment of the satisfied subscriptions; and
selecting, based on the application priority data, a subset of the satisfied subscriptions for fulfillment.

18. The computer-implemented method of claim 17, further comprising:
exclusively fulfilling the subset of the satisfied subscriptions by:
causing one or more notifications to be transmitted in associating with the subset of the satisfied subscriptions; and
preventing notifications from being transmitted in associating with an unselected remainder of the satisfied subscriptions.

19. The computer-implemented method of claim 17, wherein the selecting the subset of the satisfied subscriptions includes selecting a predetermined number of the satisfied subscriptions to fulfill for each individual client device.

20. The computer-implemented method of claim 17, further comprising:
transmitting at least one individual notification to a notification hub based on the subset of the satisfied subscriptions; and
refraining from transmitting other notifications to the notification hub based on other ones of the satisfied subscriptions that are omitted from the subset.

* * * * *

UNITED STATES PATENT AND TRADEMARK OFFICE
CERTIFICATE OF CORRECTION

| | | Page 1 of 1 |
|---|---|---|
| PATENT NO. | : 10,461,950 B2 | |
| APPLICATION NO. | : 15/901795 | |
| DATED | : October 29, 2019 | |
| INVENTOR(S) | : Adri Stephane Verlaan et al. | |

It is certified that error appears in the above-identified patent and that said Letters Patent is hereby corrected as shown below:

On the Title Page

Item (54) and in the Specification, Column 1, Lines 1-5, delete:
"PREVENTING TRANSMISSION OF DUPLICATE NOTIFICATIONS TO MULTIPLE APPLICATIONS ON A CLIENT DEVICE"

And insert:
--PREVENTING TRANSMISSION OF DUPLICATIVE NOTIFICATIONS TO MULTIPLE APPLICATIONS ON A CLIENT DEVICE--

Signed and Sealed this
Tenth Day of December, 2019

Andrei Iancu
*Director of the United States Patent and Trademark Office*